Feb. 24, 1953  V. M. ZILER  2,629,626
SUN-STOP VISOR ATTACHMENT
Filed May 20, 1949
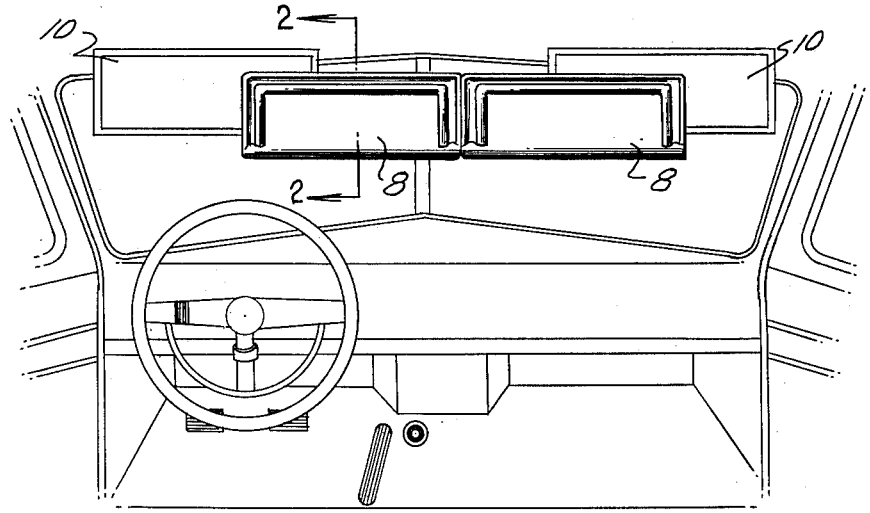
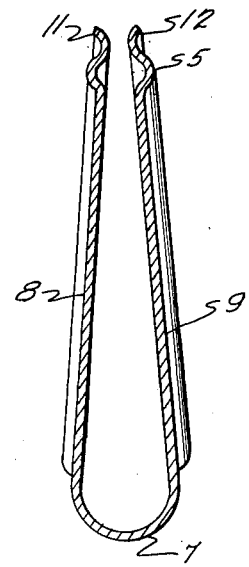
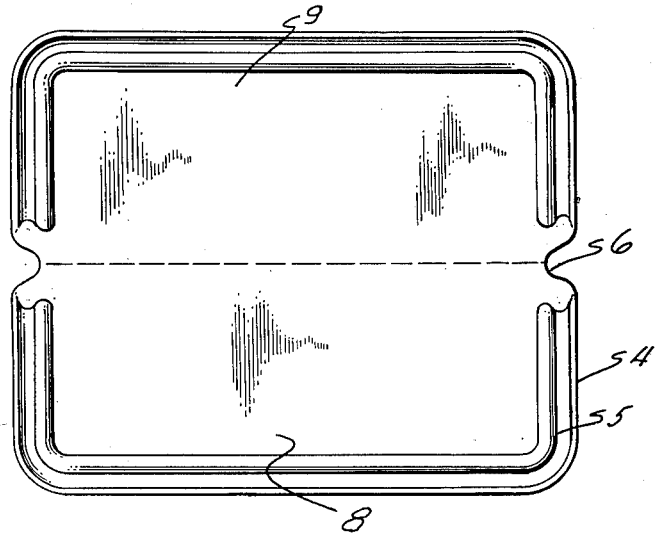
INVENTOR.
VERNE M. ZILER
BY
McMorrow, Berman & Davidson
ATTORNEYS Patented Feb. 24, 1953

2,629,626

UNITED STATES PATENT OFFICE 2,629,626

SUN-STOP VISOR ATTACHMENT

Verne M. Ziler, Crescent City, Calif.

Application May 20, 1949, Serial No. 94,382

2 Claims. (Cl. 296—97)

This invention relates to a sun visor for motor vehicles, and more particularly to an adjustable attachment for the conventional sun visor.

The primary object of this invention is to provide an adjustable attachment for the conventional motor vehicular sun visor, which attachment may be conveniently and quickly mounted on the conventional sun visor in a plurality of angular positions relative to the latter.

Another object of this invention is to provide an adjustable attachment which is effectively mounted on the conventional vehicular sun visor without the need of bolts, nuts, or special clamping devices.

A further object of this invention is to provide a sun visor attachment for the conventional vehicular sun visor, and which is held in a selected angular position with respect to the sun visor by means of frictional engagement with the latter.

Other objects and advantages will become apparent from the following description of the drawing, wherein:

Figure 1 is a front elevational view of a pair of the sun visor attachments forming this invention, the attachments being in an operative position and mounted on a pair of conventional motor vehicular sun visors;

Figure 2 is a side elevational view in cross-section taken along the line 2—2 of Figure 1;

Figure 3 is a plan view of the blank from which the attachment of the present invention is made.

In the drawing, wherein like numerals refer to identical parts, the sun visor attachment of this invention is formed from a rectangular blank 4 fabricated from a sheet of resilient material, preferably of some light metal, or from a sheet of plastic material, as shown in Figure 3. The sheet 4 may be stamped to size from light stock, and the sheet 4 is preferably formed to include a reinforcing rib 5 which extends substantially around the perimeter of the sheet 4 and is spaced from the edges of the latter. The sheet 4 is preferably provided with a notch 6 on each of its side edges, the notches being aligned with each other and located along the longitudinal center line of said sheet.

The sheet 4, having been cut to size and stamped as previously described, is folded upon itself along the longitudinal center line thereof to form, as shown in Figure 2, a folded portion 7 of substantially semi-circular shape in cross-section and having legs 8 and 9 extending therefrom, the legs being spaced from each other a sufficient distance to embrace therebetween a conventional sun visor 10 of a motor vehicle. The free ends 11 and 12 of the legs 8 and 9, respectively, are normally spaced from each other a distance slightly less than the thickness of the sun visor 10, the legs 8 and 9 being spreadable to slidably receive the sun visor therebetween with the ends 11 and 12 frictionally engageable with the adjacent surfaces of the latter.

As is best seen in Figures 1 and 2, the attachment is conveniently mounted on the conventional motor vehicular sun visor 10 by spreading the ends 11 and 12 of the legs 8 and 9, respectively, a distance substantially equivalent to the thickness of the visor 10. The attachment may then be slidably positioned on the sun visor 10, so that the visor 10 is embraced between the legs 8 and 9 with the ends 11 and 12 frictionally engaging the adjacent portions of the visor. As is obvious, the attachment may be adjusted to a plurality of angular positions relative to the visor 10, both vertical and horizontal adjustments being possible. The ends 11 and 12 frictionally grip the adjacent surfaces of the visor 10, so as to securely hold the attachment in its selected adjusted position relative to the visor.

If desired, a pair of attachments can be used jointly, as shown in Figure 1, so that the sun rays, projecting between the two vehicular visors 10, 10, can be blocked.

I claim:

1. In an adjustable attachment for mounting on a vehicular sun visor, a rectangular sheet folded upon itself along the longitudinal center line thereof to form a folded portion of substantially semi-circular shape in cross-section and having legs extending therefrom, the legs being spaced from each other to embrace therebetween said sun visor, the free ends of said legs being normally spaced from each other a distance slightly less than the thickness of said visor, said legs being spreadable to slidably receive said visor therebetween with its ends frictionally engageable with the adjacent surfaces of said ends, whereby with the legs of said attachment in embracing relation with respect to said sun visor the attachment is adjustable horizontally and vertically to a plurality of angular positions relative to said sun visor.

2. In an adjustable attachment for mounting on a vehicular sun visor, a rectangular sheet folded upon itself along the longitudinal center line thereof to form a folded portion of substantially semi-circular shape in cross-section and having legs extending therefrom, the legs being spaced from each other to embrace therebetween said sun visor, the free ends of said legs being normally spaced from each other a distance slightly less than the thickness of said visor, there being a reinforcing bead along each leg adjacent the free end thereof, said legs being spreadable to slidably receive said visor therebetween with its ends frictionally engageable with the adjacent surfaces of said ends, whereby with the legs of said attachment in embracing relation with respect to said sun visor the attachment is adjustable horizontally and vertically to a plurality of angular positions relative to said sun visor.

VERNE M. ZILER.

REFERENCES CITED

The following references are of record in the file of this patent:

UNITED STATES PATENTS

| Number | Name | Date |
|---|---|---|
| 2,027,433 | Jacobs | Jan. 14, 1936 |
| 2,185,898 | Mitchell | Jan. 2, 1940 |
| 2,343,843 | Horton | Mar. 7, 1944 |
| 2,382,875 | Handley | Aug. 14, 1945 |